United States Patent
Savagner et al.

(10) Patent No.: US 7,451,689 B2
(45) Date of Patent: Nov. 18, 2008

(54) COMBINED SERVICE BRAKE AND SPRING BRAKE CYLINDER ASSEMBLY

(75) Inventors: Nicolas Savagner, Le Mesnil Eudes (FR); Thierry Maille, Rocques (FR); Alain Fantazi, Dives sur mer (FR)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 27 days.

(21) Appl. No.: 11/714,142

(22) Filed: Mar. 6, 2007

(65) Prior Publication Data
US 2007/0214953 A1 Sep. 20, 2007

Related U.S. Application Data

(63) Continuation of application No. PCT/EP2005/009373, filed on Aug. 31, 2005.

(30) Foreign Application Priority Data
Sep. 6, 2004 (DE) .................. 10 2004 042 992

(51) Int. Cl.
*F01B 7/20* (2006.01)
(52) U.S. Cl. .............................. 92/52; 92/63
(58) Field of Classification Search ............ 92/52, 92/62–64
See application file for complete search history.

(56) References Cited

U.S. PATENT DOCUMENTS 3,188,922 A    6/1965    Cruse

FOREIGN PATENT DOCUMENTS

| CH | 163735 | 8/1933 |
|----|--------|--------|
| DE | 23 52 313 A1 | 5/1974 |
| DE | 23 64 535 | 7/1974 |
| EP | 0 452 621 B1 | 10/1991 |
| GB | 1 401 020 | 7/1975 |
| GB | 1 408 287 | 10/1975 |

*Primary Examiner*—F. Daniel Lopez
(74) *Attorney, Agent, or Firm*—Crowell & Moring LLP

(57) ABSTRACT

A combined service brake and spring brake cylinder for the braking system of a motor vehicle, in particular for utility vehicles, includes service and spring brake pistons guided inside a casing which is common for the two brake cylinders. The spring brake piston is loaded by at least one storage spring and has an external diameter greater than that of the service brake piston. The spring brake piston is in the form of an annular piston, and at least a part of the rod thereof is constructed in the form of a piston tube, which surrounds the service brake piston and forms an external radial running and sealing surface therefor.

12 Claims, 1 Drawing Sheet

COMBINED SERVICE BRAKE AND SPRING BRAKE CYLINDER ASSEMBLY

CROSS-REFERENCE TO RELATED APPLICATIONS

This application is a continuation of PCT International Application No. PCT/EP2005/009373, filed on Aug. 31, 2005, which claims priority under 35 U.S.C. §119 to German Application No. 10 2004 042 992.8, filed Sep. 6, 2004, the entire disclosures of which are expressly incorporated by reference herein.

BACKGROUND AND SUMMARY OF THE INVENTION

The invention relates to a combined service brake and spring brake cylinder assembly for brake systems of vehicles, in particular for commercial vehicles.

A combined service brake and spring brake cylinder assembly is known from EP 0 452 621 B1. Within the housing is inserted an inner housing, which is formed from a bottom and a cylinder, and within which the service brake piston is guided displaceably. A pressure chamber capable of being acted upon by pressure medium for the service brake piston is formed between the service brake piston and the inner housing bottom facing the spring piston. The spring piston surrounds the inner housing in a pot-shaped manner and is guided displaceably by way of a seal on the outer wall of the inner housing. The pressure chamber of the spring piston is formed between the bottom of the inner housing and the spring piston.

A generic combined service brake and spring brake cylinder assembly is described in U.S. Pat. No. 3,188,922 A, in which a flexible hose is provided for the supply of pressure medium to a pressure connection of the pressure chamber of the service brake. The flexible hose extends between the displaceable bottom of the spring piston and a housing bottom, and has to be held on the pressure connection and must be capable of following the movement of the spring piston. Since the displaceable bottom is in one piece with the spring brake piston, the hose is driven by the spring brake piston moving into the application position. With the spring brake released, therefore, the hose is in the rolled-up state, whereas, when the spring brake is applied, it unwinds and, at the transition from one state to the other, comes under bending load. So that higher brake pressures can be withstood, the casing wall of such a hose must be dimensioned relatively large, as a result of which, however, it becomes more rigid and the bending stresses acting in it increase, thus reducing its service life in terms of fatigue strength under bending and, above all, possibly putting its leaktightness at risk, which, in an extreme situation, leads to a failure of the service brake when the pressure chamber of the service brake is no longer supplied with compressed air.

A further combined service brake and spring cylinder is described in DE 23 52 313 A.

The object on which the present invention is based is to develop further a combined service brake and spring brake cylinder of the type above-mentioned type such that it functions more reliably.

This, and other, objects are achieved, according to the invention, by a combined service brake and spring brake cylinder for brake systems of vehicles, in particular of commercial vehicles, having a spring and service brake piston guided within a housing common to both brake cylinders. The spring brake piston is loaded by at least one preloaded spring and has a larger outside diameter than the service brake piston. The spring brake piston is an annular piston, and at least part of its piston rod, designed as a piston tube, surrounds the service brake piston and forms a radially outer running and sealing surface for the latter.

The invention advantageously proposes that the bottom be formed, with the exception of a radially outer annular portion fastened to the piston tube and capable of butting against the service brake piston, by a flexible diaphragm which, with the pressure chamber aerated, can be supported on a housing bottom.

The maximum bursting pressure of this diaphragm does not then need to be designed in terms of the maximum brake pressure, since, when the pressure chamber of the service brake is aerated, this diaphragm is supported on the rigid housing bottom, so that the wall thickness of the diaphragm can have a correspondingly small dimensioning, thus increasing its flexibility, and it is therefore also suitable for relatively large piston strokes of the spring piston, without the bending load on the diaphragm becoming too high. The supply of pressure medium into the pressure chamber may then take place, for example, via a rigid tube, which projects through the housing bottom and to which a radially inner edge of the diaphragm is fastened. By contrast, the radially outer diaphragm edge connected to the annular portion follows the movement of the spring brake piston. Since no movement seals are necessary in order to implement this arrangement, a reliable sealing off of the pressure chamber of the service brake, along with a high service life, is achieved.

Advantageous developments and improvements of the invention are further described and claimed herein.

Particularly preferably, the spring brake piston is connected axially to the piston tube approximately at its middle diameter, with the preloaded spring surrounding the piston tube. A radially inner circumferential surface of the housing then constitutes a radially outer running and sealing surface for the spring brake piston, and between the running and sealing surface and a housing cover composed of a bottom and a cylinder, is formed a pressure chamber of the spring brake piston.

A return spring supported on the housing cover urges the service brake piston toward the displaceable bottom of the pressure chamber of the service brake. The bottom, in turn, is capable of butting against a housing bottom. A central pressure rod acting on a brake mechanism and projecting through a passage orifice of the housing cover projects away from the service brake piston.

The further construction of the combined service brake and spring brake cylinder according to the invention becomes clear from the following description of an exemplary embodiment.

Other objects, advantages and novel features of the present invention will become apparent from the following detailed description of the invention when considered in conjunction with the accompanying drawings.

BRIEF DESCRIPTION OF THE DRAWING

The single FIGURE shows a highly diagrammatic cross-sectional illustration of a combined service brake and spring brake cylinder according to a preferred embodiment of the invention.

DETAILED DESCRIPTION OF THE DRAWING

Figure 1:
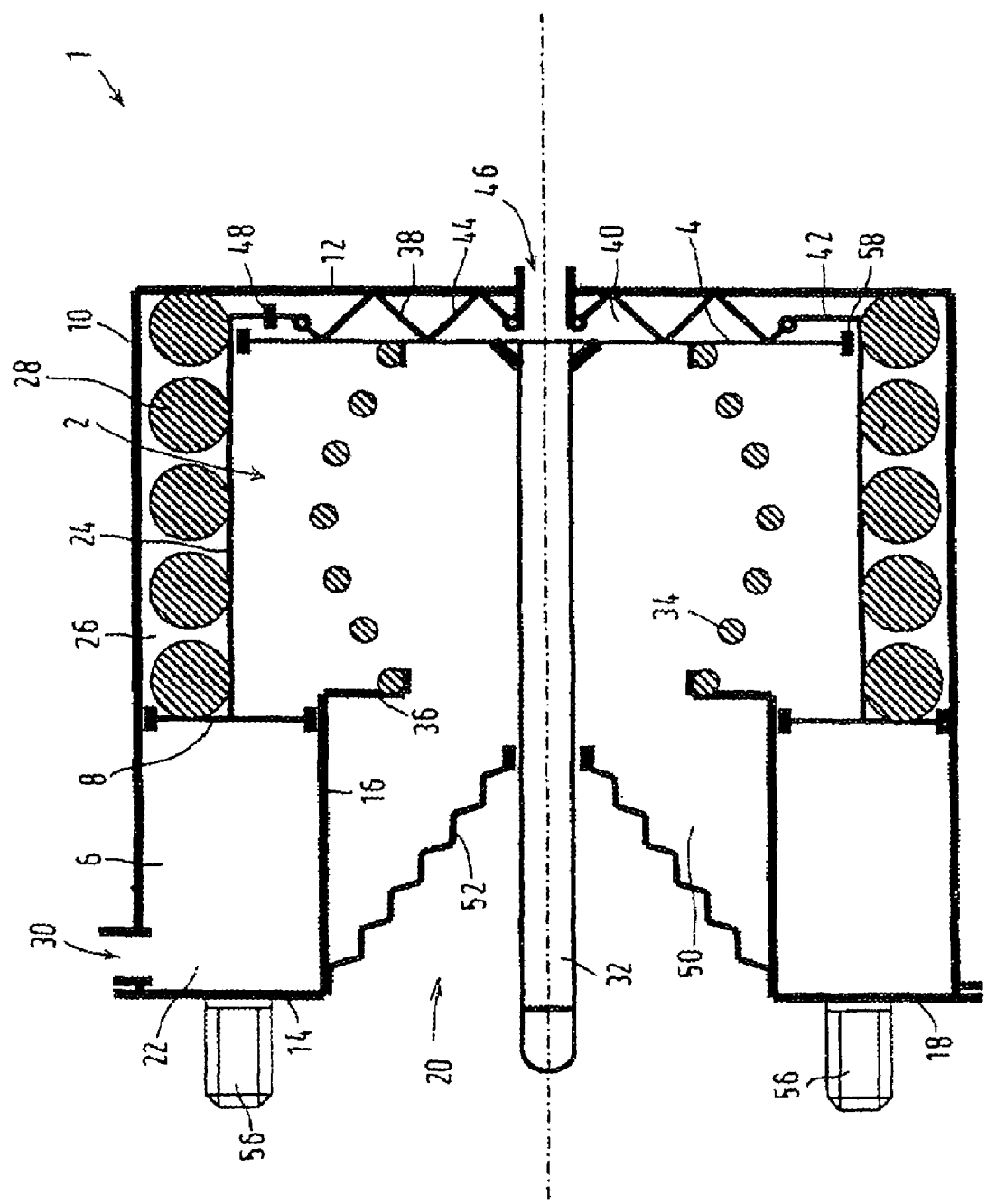

The preferred embodiment, designated as a whole by 1 in the FIGURE, of a combined service brake and spring brake cylinder forms a brake actuator, for example, for disc brakes of commercial vehicles and is actuated pneumatically. It contains a service brake cylinder 2, in which a service brake piston 4 is guided displaceably, and a spring brake cylinder 6, which guides a spring piston 8. Both brake cylinders 2, 6 are received in a single housing 10, which has an internally smooth cylindrical form and is of a bowl-shaped design, that is to say it is delimited at one end by a housing bottom 12 and at its other end has an orifice 20 closed by way of a housing cover 18 composed of a bottom 14 and of a cylinder 16. The cylinder 14 and housing 10 are coaxial to one another.

The spring piston is designed as an annular piston 8 and has a central passage orifice. A radially inner circumferential surface of that end of the housing 10 which faces the orifice 20 and also the cylinder 16 form, in each case, a running and sealing surface for the spring piston 8, which can carry corresponding seals on its circumference. Furthermore, between the radially inner circumferential surface of the housing 10 and the housing cover 18 composed of the bottom 14 and of the cylinder 16, a pressure chamber 22 is formed for the spring brake piston 8. The bottom 14 of the pressure chamber 22 is consequently to be treated as equivalent to the annular end face of the housing cover 10 or of the housing 10 itself. The housing cover 18 may be produced in one piece, in which case the cylinder 16 and the bottom 14 form a single part which is flanged to the housing 10, or it may also be produced in more than one piece. A piston rod, designed as a piston tube 24 closed on the circumference, projects from the spring brake piston 8 away in the direction of the housing bottom 12. The piston tube 24 is connected approximately at a middle diameter of the spring brake piston 8.

In an annular space 26 between a radially inner circumferential surface of the housing 10 and a radially outer circumferential surface of the piston tube 24 a preloaded spring 28 is accommodated, which is supported, on the one hand, on the spring brake piston 8 and, on the other hand, on the housing bottom 12. The preloaded spring 28 thus surrounds the piston tube 24 of the spring brake piston 8 completely. By way of an air connection 30 connected to the pressure chamber 22 of the spring brake piston, the pressure chamber 22 can be pressurized and depressurized. The spring brake is a passive brake, that is to say it is released, counter to the action of the preloaded spring 28, by the pressurization of the pressure chamber 22 and, after depressurizing of the pressure chamber 22, is applied by the spring forces of the preloaded spring 28.

The spring brake piston 8 has a larger outside diameter than the preferably cylindrical service brake piston 4. The latter is guided axially displaceably along its entire actuating travel with its radially outer circumference on the radially inner circumference of the piston tube 24 of the spring brake piston 8. That is to say, the piston tube 24 forms a radially outer running and sealing surface for the circumference of the service brake piston 4, into which, for example, seals, not shown here, may be embedded. A central pressure rod 32 projects away from the service brake piston 4 and through the orifice 20 of the housing cover 18 and acts on a brake mechanism, not relevant here, of the disc brake. A release system for the disc brake may be integrated into the pressure rod.

Furthermore, the service brake piston 4 is supported by a return spring 34 on a collar 36 of the housing cover 18, the collar projecting radially inward on the end face. The return spring 34 is shaped in longitudinal cross section, for example, so as to bulge outward or inward, so that, during compression, the turns can penetrate axially one into the other so as to save construction length.

The piston tube 24 carries on the end face, on its side facing away from the spring brake piston 8, an axially displaceable bottom 38, a pressure chamber 40 of the service brake being formed between this bottom 38 and the service brake piston 4. The service brake piston 4 is urged toward the displaceable bottom 38 by the return spring 34. Last but not least, the displaceable bottom 38 and the piston tube 24 fastened, pressure tight, to it, form together the outer wall of the axially displaceable service brake cylinder 2. The displaceable bottom 38 of the pressure chamber 40 of the service brake is capable of butting against the housing bottom 12. In particular, the return spring 34 urges it into this position. Furthermore, during the actuation of the spring brake in the application direction, the service brake piston 4 is designed to be capable of being driven in the brake application direction by the bottom 38. This may be implemented, for example, in that the bottom 38, with the exception of its radially outer annular portion 42, which is fastened to the piston tube 24 and which must be manufactured from rigid material so as to be capable of butting against the service brake piston 4, is formed by a flexible diaphragm 44, which is fastened to the annular portion 42 radially on the inside and which can be supported on the housing bottom 12 when the pressure chamber 40 is aerated. In order to make this situation clear, the bottom 38 of the pressure chamber 40 is illustrated as a sawtooth profile. In actual fact, the bottom 38 may even be flat.

Preferably, the bottom 38 is provided with a central connection for aerating the pressure chamber 40 of the service brake, the connection consisting, for example, of a rigid tube projecting through the housing bottom 12 from outside and opening into the bottom 38. This connection cooperates with an inlet valve 46, not shown in detail for reasons of scale. An outlet valve 48 for relieving the pressure chamber 40 is introduced, for example, into the annular portion 42 of the bottom 38. The outlet and inlet valves 46 and 48 are, for example, electrically controlled valves and are actuated by an electronic control apparatus, not shown for reasons of scale. The service brake is an active brake, that is to say it is applied as a result of the pressurization of the assigned pressure chamber 40 and is released due to depressurization.

The space 50 between the service brake piston 4 and the housing cover 12 is protected against dirt and moisture, for example, by use of a sleeve 52, the sleeve having a central sealing passage orifice for the pressure rod 32 and being fastened to the housing cover 18 radially on the inside. A radially outer sealing ring 58 on the service brake piston 4 ensures the leaktight guidance of the latter on the piston tube 24. Alternatively, this could also be implemented by a diaphragm. With the aid of bolts 56, the housing 10 carrying the brake actuator can be connected to a flange of the disc brake.

Against this background, the functioning of the combined service brake and spring brake cylinder 1 according to the invention is as follows.

To apply the service brake, with the spring brake released, compressed air is fed into the pressure chamber 40 of the service brake via the open inlet valve 46 when the outlet valve 48 is closed. As a result, on the one hand, the diaphragm 44 forming the bottom 38 of the pressure chamber 40 is urged toward the housing bottom 12 and, on the other hand, the service brake piston 4 is displaced to the left in the FIGURE, its radially outer circumference sliding sealingly along on the radially inner circumferential surface of the piston tube 24. The pressure prevailing in the pressure chamber 22 of the spring brake ensures that, as shown in the FIGURE, the preloaded spring 28 is compressed and the spring brake is consequently also released. To release the service brake, the assigned pressure chamber 40 merely has to be relieved, the return spring 34 pushing the service brake piston 4 back into its initial position.

To engage the spring brake, for example in a parking brake situation, the pressure chamber 40 of the service brake is deaerated by the outlet valve 48, and at the same time also the pressure chamber 22 of the spring brake is relieved, whereupon the preloaded spring 28 displaces the spring brake piston 8 to the left. The latter, via the piston tube 24, can drive the bottom 38 of the then deaerated pressure chamber 40 of the service brake, because no pressure resistance is opposed to this movement on account of the deaerated pressure chamber 40. When the spring brake piston 8 has reached its application position, the service brake piston 4 is consequently also detained in the applied position owing to the action of the preloaded spring forces.

To engage the parking brake, the spring brake piston can also detain the already previously applied service brake piston 4, in that the initially aerated pressure chamber 40 of the service brake is deaerated and the spring brake piston 8, is displaced to the left into the application position due to the dearation of its pressure chamber 22. No compressed air is therefore required in order to hold the parking brake in the applied position for a lengthy period of time.

To release the spring brake, the pressure chamber 22 of the spring brake is pressurized, whereupon the spring brake piston 8 is moved to the right, counter to the action of the preloaded spring 28, together with the piston tube 24 and the bottom 38 of the pressure chamber 40 of the service brake. This movement can be followed by the service brake piston 4 which is in abutment against the bottom 38 of its pressure chamber, because the return spring 34 urges the service brake piston toward there, and because the pressure chamber 40, deaerated as before, of the service brake affords no pressure resistance.

| Table of reference symbols | |
|---|---|
| 1 | Combined service brake and spring brake cylinder |
| 2 | Service brake cylinder |
| 4 | Service brake piston |
| 6 | Spring brake cylinder |
| 8 | Spring brake piston |
| 10 | Housing |
| 12 | Housing bottom |
| 14 | Bottom |
| 16 | Cylinder |
| 18 | Housing cover |
| 20 | Orifice |
| 22 | Pressure chamber |
| 24 | Piston tube |
| 26 | Annular space |
| 28 | Preloaded spring |
| 30 | Air connection |
| 32 | Pressure rod |
| 34 | Return spring |
| 36 | Collar |
| 38 | Bottom |
| 40 | Pressure chamber |
| 42 | Annular portion |
| 44 | Diaphragm |
| 46 | Inlet valve |
| 48 | Outlet valve |
| 50 | Space |
| 52 | Sleeve |
| 56 | Bolt |
| 58 | Seal |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combined service brake and spring brake cylinder for a vehicle brake system, comprising:
    a housing common to both the service brake and the spring brake cylinders;
    a spring brake piston and a service brake piston, the spring and the service brake pistons being guided within the housing;
    at least one preloaded spring for loading the spring brake piston, the preloaded spring having a larger outer diameter than the service brake piston;
    wherein the spring brake piston is an annular piston having a piston rod, at least part of the piston rod being configured as a piston tube surrounding the service brake piston and forming a radially outer running and sealing surface for the service brake piston;
    wherein the piston tube of the spring brake piston carries, on a side facing away from the spring brake piston, an axially displaceable bottom;
    a pressure chamber of the service brake cylinder formed between the axially displaceable bottom and the service brake piston;
    wherein the axially displaceable bottom is formed of a flexible diaphragm, with an exception of a radially outer annular portion fastened to the piston tube and capable of butting against the service brake piston, which is supportable on a bottom of the housing when the service brake pressure chamber is pressurized.

2. The combined service brake and spring brake cylinder as claimed in claim 1, wherein the spring brake piston is connected axially to the piston tube approximately at its middle diameter.

3. The combined service brake and spring brake cylinder as claimed claim 1, wherein the preloaded spring surrounds the piston tube of the spring brake piston.

4. The combined service brake and spring brake cylinder as claimed in claim 1, wherein a radially inner circumferential surface of the housing forms a radially outer running and sealing surface for the spring brake piston.

5. The combined service brake and spring brake cylinder as claimed in claim 4, wherein a pressure chamber of the spring brake is formed between the radially inner circumferential surface of the housing and a housing cover composed of a bottom and of a cylinder.

6. The combined service brake and spring brake cylinder as claimed in claim 5, further comprising return spring of the service brake piston supported on the housing cover.

7. The combined service brake and spring brake cylinder as claimed in claim 6, wherein the return spring urges the service brake piston toward the axially displaceable bottom of the pressure chamber of the service brake.

8. The combined service brake and spring brake cylinder as claimed in claim 7, wherein, during the actuation of the spring brake in an application direction, the service brake piston is operatively configured to be driveable in the brake application direction by the axially displaceable bottom.

9. The combined service brake and spring brake cylinder as claimed in claim 8, wherein the axially displaceable bottom is provided with at least one connection for aeration and/or deaeration of the pressure chamber of the service brake.

10. The combined service brake and spring brake cylinder as claimed in claim 9, further comprising a central pressure rod projecting away from the service brake piston and acting on a brake mechanism.

11. The combined service brake and spring brake cylinder as claimed in claim 10, wherein the pressure rod projects through a passage orifice of the housing cover.

12. The combined service brake and spring brake cylinder as claimed in claim 11, wherein the preloaded spring is supported, on the one hand, on the spring brake piston and, on the other hand, on the housing bottom.

* * * * *